United States Patent [19]
Tsai

[11] Patent Number: 5,845,180
[45] Date of Patent: Dec. 1, 1998

[54] APPARATUS HAVING A SIMPLIFIED DRIVING DEVICE FOR SCANNING AN ORIGINAL SHEET

[75] Inventor: Jenn-Tsair Tsai, Taoyuan Hsien, Taiwan

[73] Assignee: Mustek Systems, Inc., Hsinchu, Taiwan

[21] Appl. No.: 795,175

[22] Filed: Feb. 4, 1997

[51] Int. Cl.⁶ .............................. H04N 1/10; G03G 15/04
[52] U.S. Cl. ............................................ 399/211; 358/497
[58] Field of Search ...................................... 358/497, 498, 358/474, 487; 399/211, 200, 201, 202

[56] References Cited

U.S. PATENT DOCUMENTS

| | | | |
|---|---|---|---|
| 5,072,304 | 12/1991 | Abe et al. | 358/497 X |
| 5,153,738 | 10/1992 | Stemmle | 358/497 X |
| 5,379,095 | 1/1995 | Oishi | 358/497 |
| 5,392,100 | 2/1995 | Yoshida | 399/211 |
| 5,523,876 | 6/1996 | Tellam et al. | 358/474 X |

FOREIGN PATENT DOCUMENTS

| | | |
|---|---|---|
| 64-25667 | 1/1989 | Japan . |
| 5-122454 | 5/1993 | Japan . |

*Primary Examiner*—Arthur T. Grimley
*Assistant Examiner*—Sophia S. Chen
*Attorney, Agent, or Firm*—McDermott, Will & Emery

[57] ABSTRACT

An optical scanner utilizes a simplified driving device for providing stable light path for improving the qualities of images. With the concern of high resolution and simple structure, the invention includes an illuminating carriage, a photoelectric converting device, a pair of lead screws and support, and a driving device. The illuminating carriage is mounted on first lead screw and support for providing light source. The photoelectric converting device disposed below the illuminating carriage is mounted on second lead screw and support. When scanning, the driving device rotates first lead screw and second lead screw to drive the illuminating carriage and the photoelectric converting device in different directions and in synchronism.

16 Claims, 4 Drawing Sheets

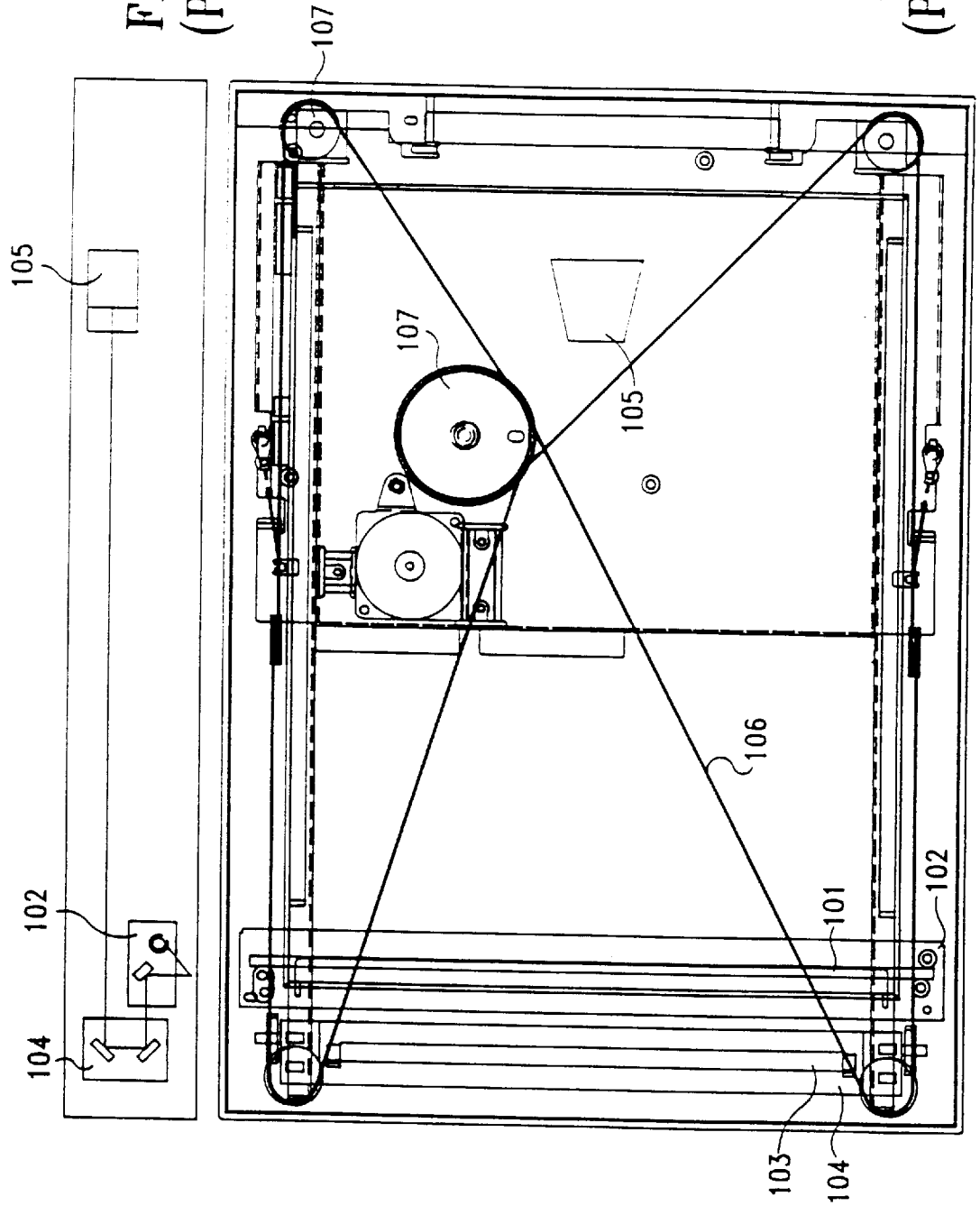

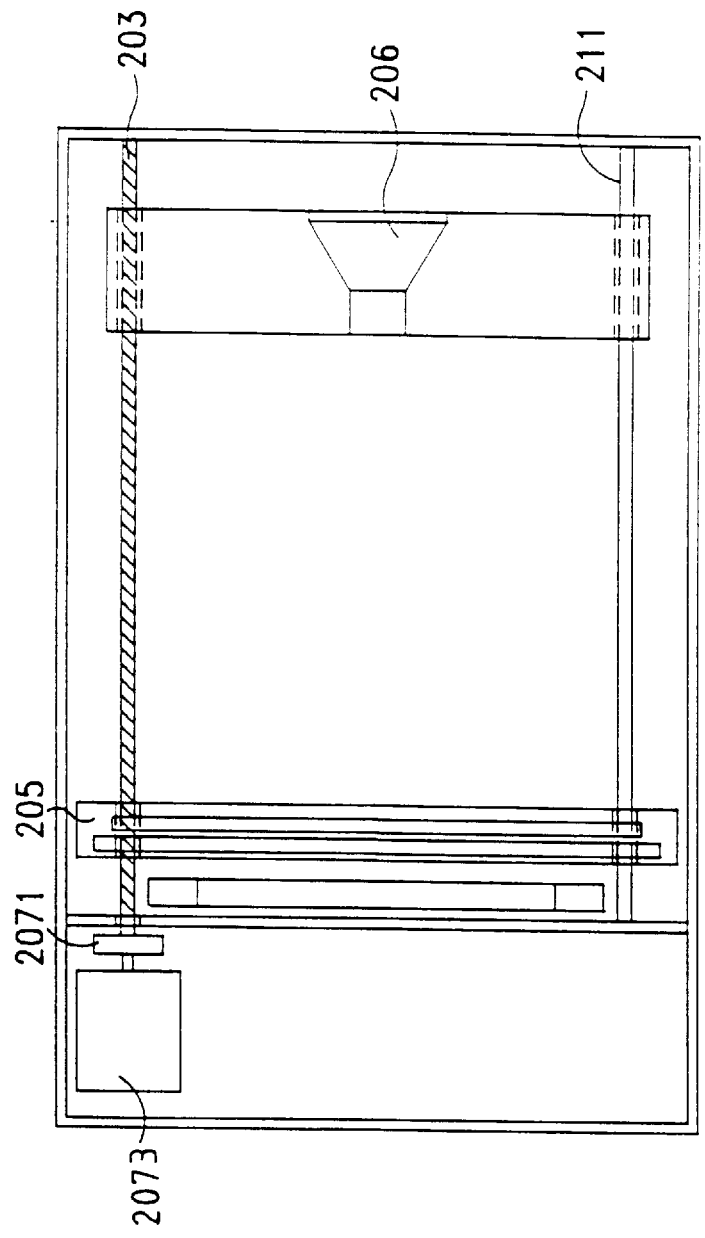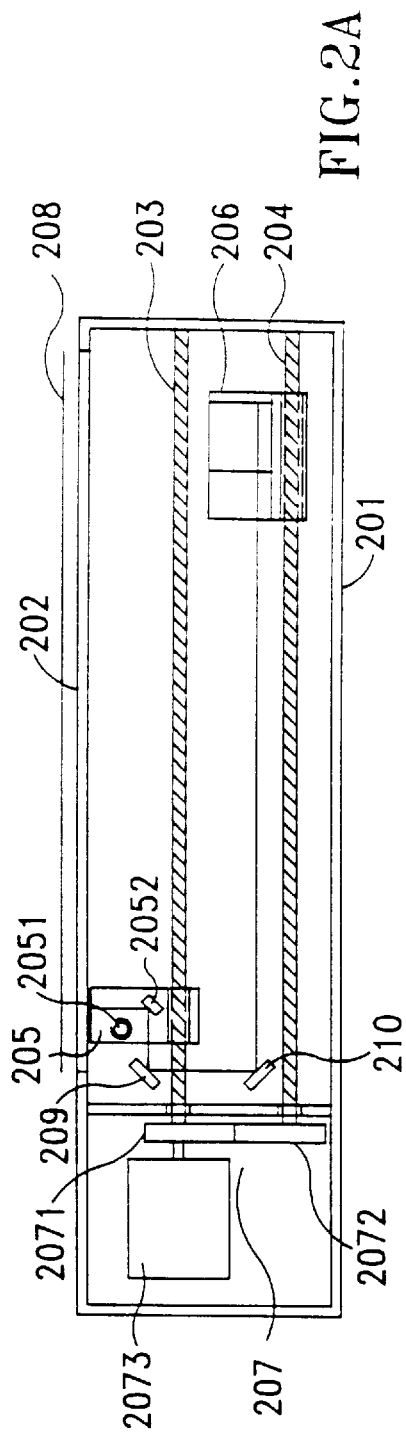
FIG. 2B
FIG. 2A

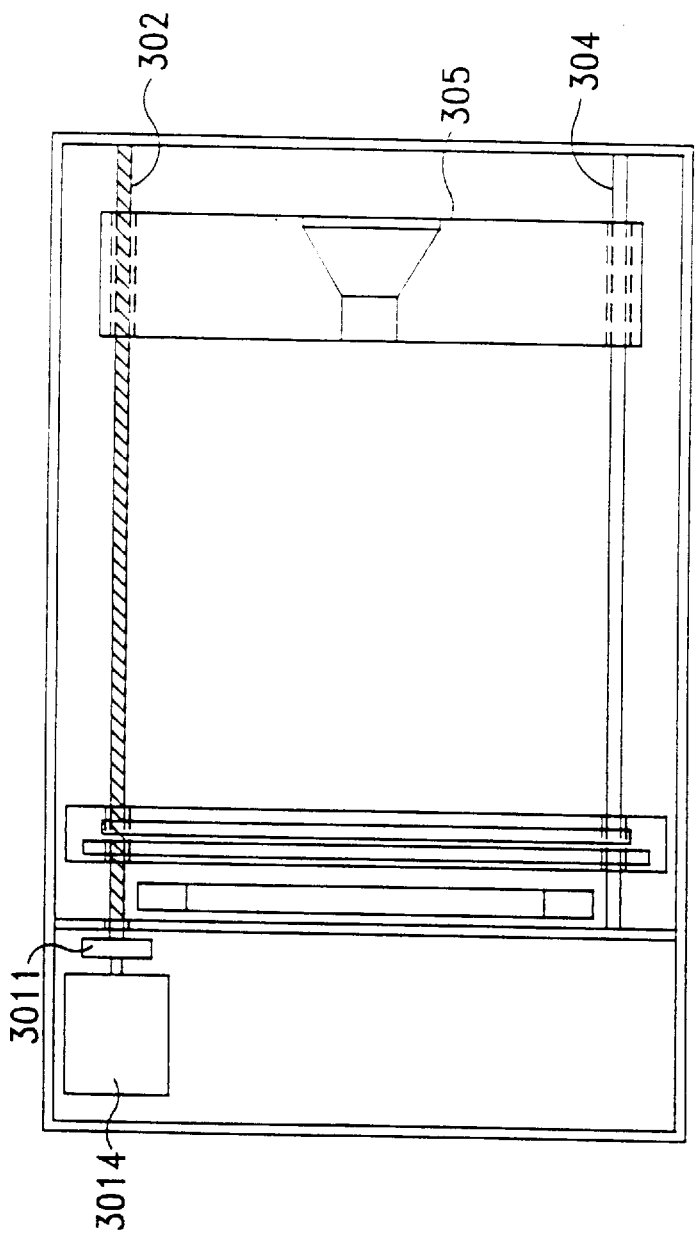
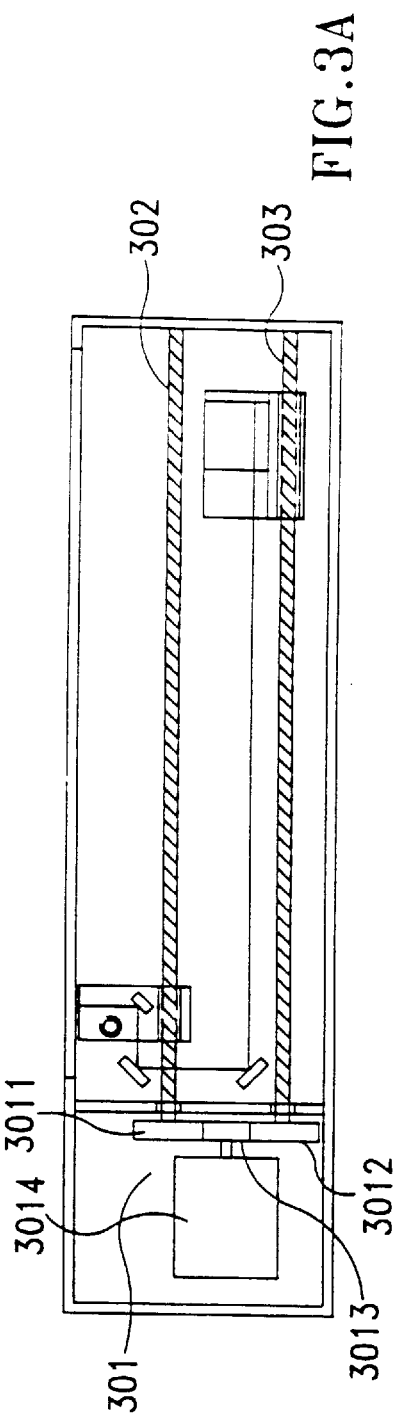
FIG. 3B
FIG. 3A

APPARATUS HAVING A SIMPLIFIED DRIVING DEVICE FOR SCANNING AN ORIGINAL SHEET

BACKGROUND OF THE INVENTION

A. Field of the Invention

The present invention relates to an optical scanner, especially to a scanner employing a pair of lead screws to simplify the inner structure of the invention and provide a stable and smooth light path.

B. Description of the Prior Art

According to the prior art technology, a flatbed scanner can reduce its size by arranging all of its optical elements into two carriages as shown in FIG. 1. The illuminating carriage 102 includes a lamp 101 for providing light source. The mirror carriage 104 includes the mirror 103 for reflecting the light beam onto the sheet. The photoelectric converting device 105 is fixed on the housing for converting the image information into electric signals.

The motion of the illuminating carriage 102 and the mirror carriage 104 is controlled by a steel wire rope 106. To maintain the stable light path, the steel wire rope 106 and the gear set 107 are arranged in such a complicated manner so that when the illuminating carriage 102 moves forward one unit distance, the mirror carriage 104 moves half unit distance. The complexity of this structure can be shown from FIG. 1. In addition to the complexity of the structure, this design also requires lots of fine parts which make the scanner hard to assemble. This will inevitably raise the manufacture cost of the apparatus. Moreover, since the illuminating carriage 102 and the mirror carriage 104 are both moving while reading images from the sheet, it is more likely to cause the light deflection or color deflection.

SUMMARY OF THE INVENTION

Accordingly, it is an object of the present invention to provide a simple-structured optical scanner which can provide stable and smooth light path thereby to improve the quality of images.

It is another object of the present invention to provide an optical scanner which is easy to assemble and maintain thereby to reduce the manufacture cost and maintenance fee.

It is a further object of the present invention to provide a stable and simple driving device for an optical scanner thereby to simplify the inner structure of the scanner and stabilize the light path.

With the concern of simplicity and quality, the invention employs a pair of lead screws for conveying the illuminating carriage and the photoelectric converting carriage along the surface of an original sheet while reading the image information of the original sheet. The invention mainly includes an illuminating carriage, a photoelectric converting device, a pair of lead screws and support devices, a driving device, and a plurality of mirrors. The illuminating carriage is mounted on first lead screw and first support device for providing a light beam shone onto the sheet. The photoelectric converting device is mounted on second lead screw and second support device for converting the light beam into electrical signals. When scanning, the driving device rotates first and second lead screws. The rotation of first and second lead screws then convey the illuminating carriage and the photoelectric converting device in different directions, at the same speed and at the same time.

BRIEF DESCRIPTION OF THE DRAWINGS

These and other objects and advantages of the present invention will become apparent by reference to the following description and accompanying drawings wherein:

FIGS. 1A and 1B are a perspective view and sectional side view showing the structure of a conventional double-carriage scanner.

FIG. 2A is a sectional side view showing the preferred embodiment of the present invention.

FIG. 2B is a perspective view showing the preferred embodiment of the present invention.

FIG. 3A is a sectional side view showing another preferred embodiment of the present invention.

FIG. 3B is a perspective view showing another preferred embodiment of the present invention.

DETAILED DESCRIPTION OF THE PREFERRED EMBODIMENTS

Figures 4A, 4B:
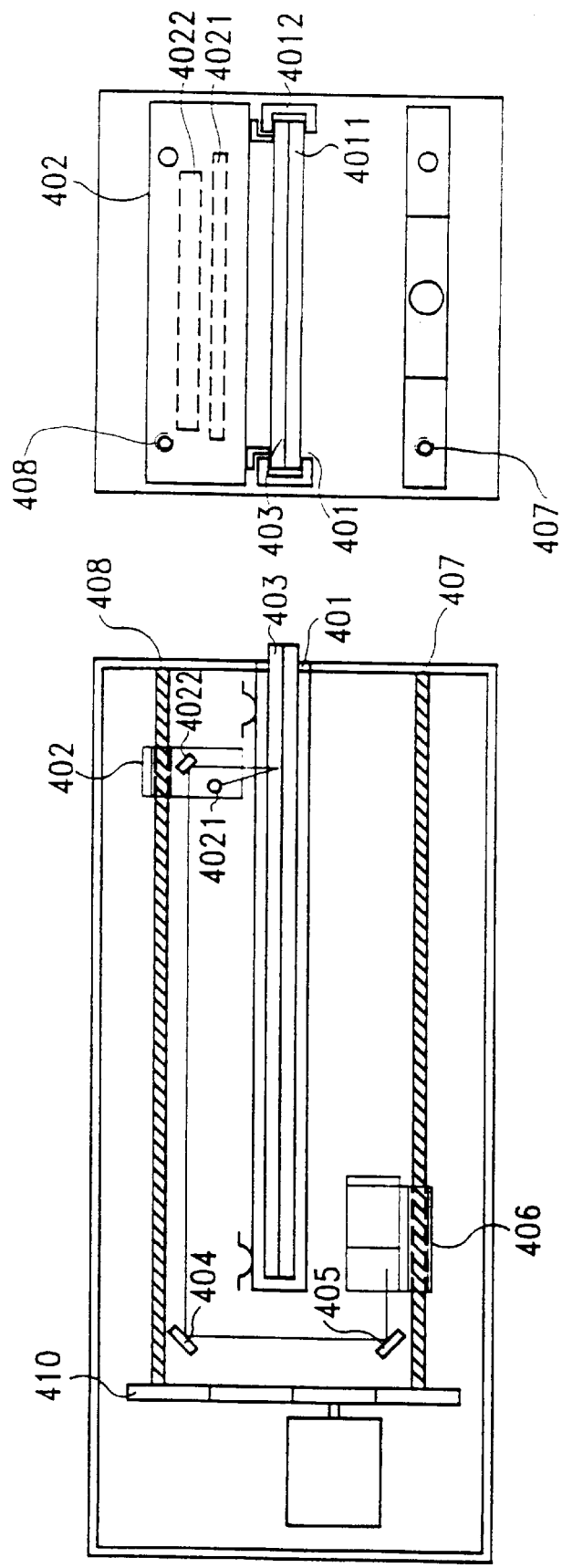
FIG. 4A is a sectional side view showing another preferred embodiment of the present invention.
FIG. 4B is a front view showing another preferred embodiment of the present invention.

A preferred embodiment of the invention is described below. This embodiment is merely exemplary. Those skilled in the art will appreciate that changes can be made to the disclosed embodiment without departing from the spirit and scope of the invention.

To simplify the inner structure of an optical scanner without sacrificing the quality of its image resolution, the invention employs a simple driving device and a pair of lead screws to convey the illuminating carriage and the photoelectric converting device smoothly along the surface of an original sheet while reading the image information of the original sheet. Refer to FIG. 2A and FIG. 2B, the invention mainly includes a housing 201, a glass table 202, first lead screw 203, first support device 211, second lead screw 204, second support device (not shown), an illuminating carriage 205, and a photoelectric converting device 206.

The glass table 202 is on top of the housing 201 for loading an original sheet 208. Under the glass table 202, there is an illuminating carriage 205 mounted on first lead screw 203 and first support 211. The illuminating carriage 205 includes a straight-tube fluorescent lamp 2051 for emitting a light beam and a mirror 2052 for reflecting the light beam onto the sheet The photoelectric converting device 206, which can be implemented as a CCD line image sensor, is mounted on second lead screw 204 and second support device (not shown). The image reflected from the original sheet can be guided to the photoelectric converting device 206 via an array of mirrors 209, 210. The photoelectric converting device 206 then converts the image information into electric signals. First lead screw 203 and first support device 211 are parallel to the glass table 202. So are second lead screw 204 and second support device (not shown). Refer to FIG. 2B for the relative positions of first lead screw 203 and second lead screw 204.

First lead screw 203 and second lead screw 204 are driven by a driving device 207. The driving device 207 consists of a master gear 2071, a slave gear 2072 and a motor 2073. First lead screw 203 and second lead screw 204 are coupled to the master gear 2071 and the slave gear 2072 respectively. When the motor 2073 is enabled, it first drives the master gear 2071 which further rotates the slave gear 2072. The rotation of the master gear 2071 and the slave gear 2072 will simultaneously rotate first lead screw 203 and second lead screw 204 with the same speed. As first lead screw 203 and second lead screw 204 are rotating, they will convey the illuminating carriage 205 smoothly in first direction and the photoelectric converting device 206 in second direction at the same speed. Notice that the screw threads of first lead screw 203 and second lead screw 204 are exactly the same. With the combination of the gear sets and the screw threads of the lead screws, the invention can control the moving speed and directions of the illuminating carriage 205 and the photoelectric converting device 206.

When the exposure of the sheet is complete, the illuminating carriage 205 and the photoelectric converting device 206 return to their initial positions for next scanning job. To disable the motor automatically, a sensor (not shown) is installed at the bottom of the housing 201 and close to the end of second lead screw 204. When the photoelectric converting device 206 is conveyed to the end of second lead screw 204, the sensor detects and sends a signal to disable the motor.

A preferred embodiment has been described in detail hereinabove. It is to be understood that the scope of the invention also comprehends embodiments different from the one described, yet within the scope of the claims. For example, FIG. 3A and FIG. 3B show another preferred embodiment of the invention. The difference between that of FIG. 2A and FIG. 3A lies in the structure of driving device. The driving device 301 of FIG. 3A consists of a first gear 3011, a second gear 3012, a master gear 3013 and a motor 3014. As shown in FIG. 3A, first lead screw 302 and second lead screw 303 are coupled to first gear 3011 and second gear 3012 respectively. The first gear 3011, and second gear 3012 are driven by a master gear 3013 which is controlled by motor 3014. When the motor 3014 rotates in counter-clockwise direction, both first lead screw 302 and second lead screw 303 will rotate in clockwise direction. Note that the screw threads of first lead screw 302 and second lead screw 303 are in opposite directions. With the arrangement of this gear set and the pattern of the screw threads, the illuminating carriage 304 and the photoelectric converting device 305 will be driven in different directions at the same speed and at the same time. Refer to FIG. 3B for the relative positions of first lead screw 302 and first support device 304.

We can also take the advantage of the structure of the lead screws and the driving device. It allows the glass table to be internal as illustrated in FIG. 4A and 4B. Since the location of the paper feeding device 401 moves to the middle of the housing, the direction of the light source has to be modified accordingly. As FIG. 4A shows, the light beam emitting from the straight-tube fluorescent lamp 4021 is shone onto the original sheet 403. The image is then reflected to the photoelectric converting means 406 via the array of mirrors 4022, 404, 405. When scanning, the illuminating carriage 402 and the photoelectric converting device 406 are conveyed along the surface of the sheet 403 in different directions, at the same speed and at the same time to maintain the light path. Since the inner space of the housing is larger than that of FIG. 2A and FIG. 3A, so the number of the gears in the gear set 410 also increases. The paper feeding device 401 consists of a transparent document tray 4011 with a groove 4012 on both sides as shown in FIG. 4B. The functions of the first lead screw 407, and second lead screw 408 are the same as that of FIG. 2A and FIG. 3A. Please refer to the description thereabove for the details.

With the arrangement of gears and a pair of lead screws, the invention can effectively simplify the structure of a scanner and also improve the quality of image read. While this invention has been described with reference to an illustrative embodiment, this description is not intended to be construed in a limiting sense. It should be understood that various alternatives to the structures described herein may be employed in practicing the present invention. It is intended that the following claims define the invention and that the structure within the scope of these claims and their equivalents be covered thereby.

What is claimed is:

1. An apparatus for reading information from an original sheet comprising:
    a housing having a glass table on the top for loading an original sheet;
    a first lead screw disposed beneath and parallel to the bottom surface side of said glass table;
    illuminating means mounted on said first lead screw for emitting a light beam shone onto said original sheet;
    a second lead screw disposed under and parallel to said first lead screw;
    photoelectric converting means disposed below said illuminating means and mounted on said second lead screw for converting said light beam into electric signals; and
    driving means coupling to said first lead screw and said second lead screw for driving said illuminating means in a first direction and said photoelectric converting means in a second direction along the surface of said original sheet, thereby to complete the exposure of the entire sheet.

2. The apparatus as claimed in claim 1, wherein said illuminating means comprises:
    a straight-tube fluorescent lamp; and
    a mirror for reflecting said light beam onto said original sheet.

3. The apparatus as claimed in claim 1, wherein said photoelectric converting means is a CCD line image sensor.

4. The apparatus as claimed in claim 1, wherein said driving means comprises:
    a motor; and
    a plurality of rotating means coupling to said motor, said first lead screw and said second lead screw for rotating said first lead screw and said second lead screw.

5. The apparatus as claimed in claim 1 further comprising:
    a plurality of mirrors for guiding said light beam reflected from said original sheet into said photoelectric converting means.

6. The apparatus as claimed in claim 1 further comprising:
    first support means located under said illuminating means and opposite to said first lead screw for keeping said illuminating means in balance; and
    second support means located under said photoelectric converting means and opposite to said second lead screw for keeping said photoelectric converting means in balance.

7. A driving apparatus for an optical scanner which comprises at least a housing having a glass table on the top for loading an original sheet, illuminating means disposed beneath the bottom surface side of said glass table for emitting a light beam shown onto said original sheet, and photoelectric converting means disposed under said illuminating means for converting said light beam into electric signals, said apparatus comprising:
    a first lead screw disposed under one side of said illuminating means and parallel to said glass table for conveying and supporting said illuminating means;
    first support means disposed under said illuminating means and opposite to said first lead screw for keeping said illuminating means in balance;
    a second lead screw disposed under one side of said photoelectric converting means and parallel to said first lead screw for conveying said photoelectric converting means;

second support means disposed under said photoelectric converting means and opposite to said second lead screw for keeping said photoelectric converting means in balance; and driving means coupling to said first lead screw and said second lead screw for driving said illuminating means in a first direction and said photoelectric converting means in a second direction along the surface of said original sheet, thereby to complete the exposure of the entire sheet.

8. The apparatus as claimed in claim 7, wherein said driving means comprises:

a motor; and a plurality of rotating means coupling to said motor, said first lead screw and said second lead screw for rotating said first lead screw and said second lead screw.

9. The apparatus as claimed in claim 8 wherein said rotating means is a gear set.

10. An image information reading apparatus comprising:

a housing having a opening at one side;

paper feeding means disposed inside said housing for loading an original sheet from said opening;

a first lead screw disposed above and parallel to said paper feeding means;

illuminating means mounted on said first lead screw for emitting a light beam shone onto said original sheet;

a second lead screw disposed below and parallel to said paper feeding means;

photoelectric converting means mounted on said second lead screw for converting said light beam into electric signals; and driving means coupling to said first lead screw and said second lead screw for driving said illuminating means in a first direction and said photoelectric converting means in a second direction along the surface of said original sheet, thereby to complete the exposure of the entire sheet.

11. The apparatus as claimed in claim 10, wherein said illuminating means comprises:

a straight-tube fluorescent lamp; and a mirror for reflecting said light beam onto said sheet.

12. The apparatus as claimed in claim 10, wherein said photoelectric converting means is a CCD line image sensor.

13. The apparatus as claimed in claim 10, wherein said driving means comprises:

a motor; and a plurality of rotating means coupling to said motor, said first lead screw and said second lead screw for rotating said first lead screw and said second lead screw.

14. The apparatus as claimed in claim 10 further comprising:

a plurality of mirrors locating inside said housing for guiding said light beam reflected from said original sheet into said photoelectric converting means.

15. The apparatus as claimed in claim 10 further comprising:

first support means located under said illuminating means and opposite to said first lead screw for keeping said illuminating means in balance horizontally; and second support means located under said photoelectric converting means and opposite to said second lead screw for keeping said photoelectric converting means in balance.

16. The apparatus as claimed in claim 10, wherein said paper feeding means comprises a transparent document tray.

* * * * *